UNITED STATES PATENT OFFICE.

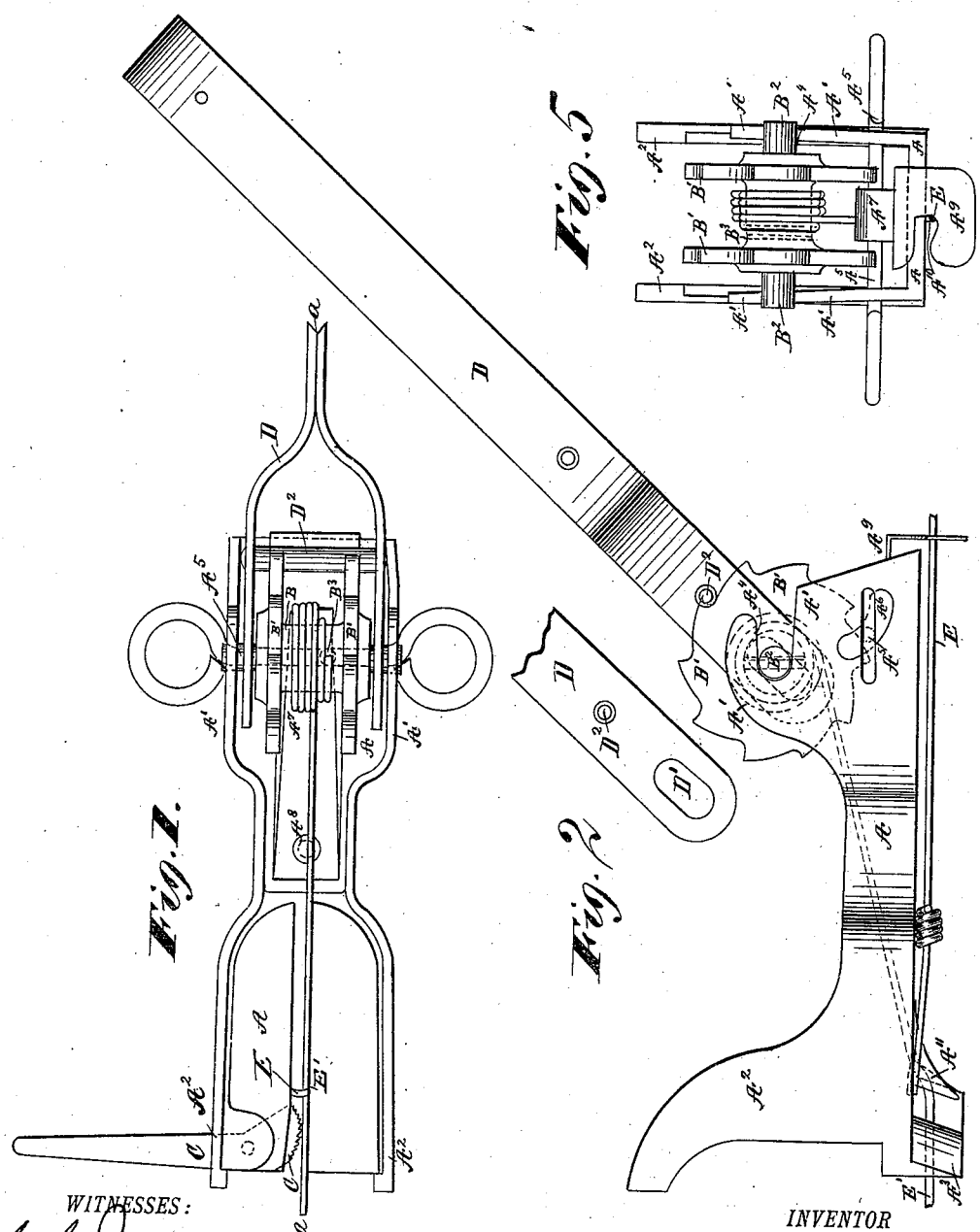

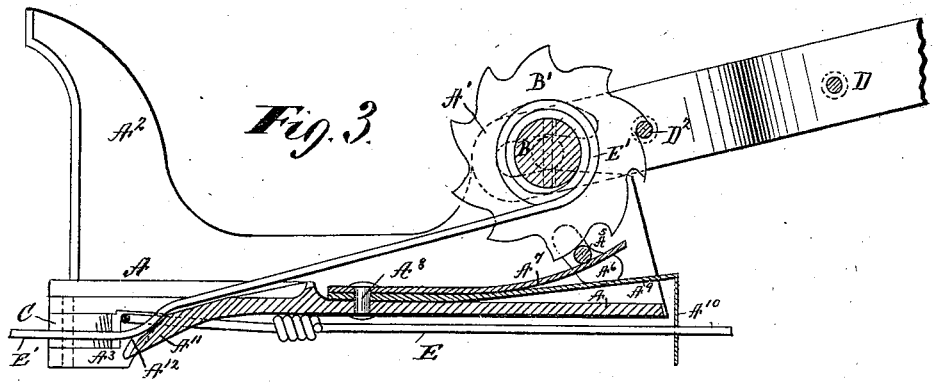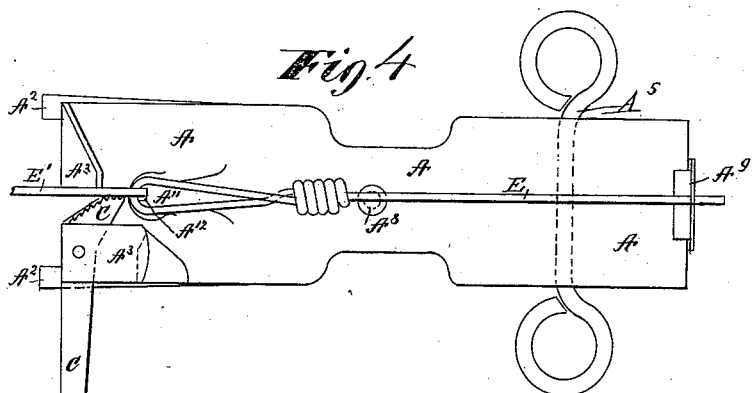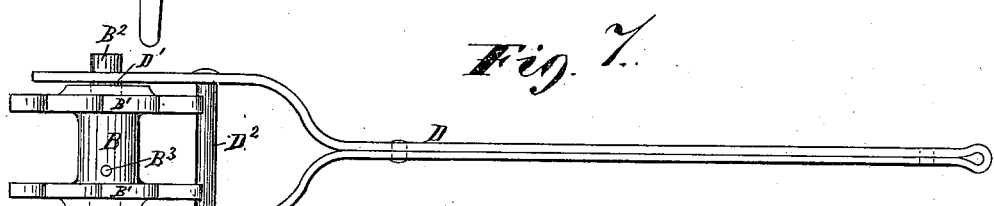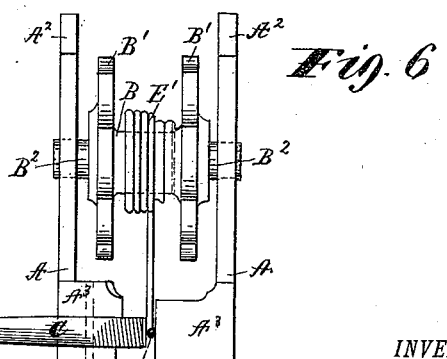

JOHN REID, OF DUNEDIN, DISTRICT OF OTAGO, NEW ZEALAND.

WIRE-STRAINING MACHINE.

SPECIFICATION forming part of Letters Patent No. 374,810, dated December 13, 1887.

Application filed August 26, 1886. Serial No. 211,946. (No model.) Patented in New Zealand March 19, 1885, No. 1,402; in England August 31, 1885, No. 10,286; in Victoria February 27, 1886, No. 4,450; in Queensland March 22, 1886; in South Australia March 26, 1886, and in New South Wales June 2, 1886.

*To all whom it may concern:*

Be it known that I, JOHN REID, a subject of the Queen of Great Britain, residing at Dunedin, in the Provincial District of Otago, in the British Colony of New Zealand, solicitor, have invented an Improved Wire-Straining Machine, (for which I have obtained patents in Great Britain, dated the 31st of August, 1885, No. 10,286, and in the following British Colonies, viz: New Zealand, patent dated the 19th day of March, 1885, and numbered 1,402; New South Wales, patent dated the 2d day of June, 1886, but unnumbered; and that applications for patents have been filed by my agent, Edward Waters, a subject of the Queen of Great Britain, residing at No. 87 Bourke Street West, in the city of Melbourne and Colony of Victoria, patent agent, as a communication from me in the following British Colonies, viz: Victoria, application filed on the 27th day of February, 1886, and numbered 4,450; that under the laws governing the grant of patents in said colony the Letters Patent will bear date as of the day of filing, and that up to the present time the patent on said application filed in said colony has not been granted; Queensland, application filed on the 22d day of March, 1886, and unnumbered, and not yet granted; that the patent when issued will bear date as of the day of issue, but the term of the patent will commence from the day of filing; and that an application for patent was filed by my agent, Walter Smythe Bayston, also a subject of the Queen of Great Britain, residing at No. 87 Bourke Street West, in the city of Melbourne aforesaid, patent agent, as a communication from me in the British Province of South Australia on the 26th day of March, 1886; that under the laws governing the grant of patents in said Province the Letters Patent will bear date as of the day of filing, and that up to the present time the patent on said application filed in said Province has not been granted, and therefore the number thereof cannot be given,) of which the following is a specification.

This invention, which is intended to be known as "Reid's Patent Titan Wire-Strainer," is based upon the principle of a former invention for which I applied for United States Letters Patent on the 17th day of September, 1885, Serial No. 177,383, patented as No. 339,319. In that case, however, the machine was permanently attached to the wire, but in the present instance the machine is not permanently attached to the wire, but is removed immediately after it has finished its work. The former machine consists of a reel carried by a frame and having ratchet-teeth formed on its flanges acted upon when straining by a suitable detachable lever, the strain being retained by a pin which fits into the ratchet-teeth and acts as a retaining-pawl.

The present invention retains the principle of the reel with its ratchet-teeth and retaining-pawl pin, but otherwise it differs materially from the former invention. It is designed specially for mending broken wire-fences, as it can be used either at or between the straining-posts, and is furnished with devices for retaining the strain while the ends of the wires are being secured; and, further, it is so constructed that when used at or away from the post the surplus wire can be unwound from the reel by pulling outward the hand-lever, between the jaws of which the reel is permanently secured, and which, with its reel, can be taken from its bearing in the frame of the machine to allow of such unwinding.

Referring to the attached drawings, Figure 1 shows a plan of the improved wire-straining machine, looking down upon it, and Fig. 2 a side elevation; Fig. 3, a longitudinal sectional elevation on the center line, $a\,a$, in Fig. 1, and Fig. 4 a plan of its under side. Fig. 5 shows an end elevation of the reel end, and Fig. 6 an end elevation of the gripper end. In both these figures the hand-lever is removed for the sake of clearness. Fig. 7 is a plan of the hand-lever with its attached reel.

A is the body of the machine, made preferably of malleable cast-iron and having the cheeks A' to support the reel B and the arms A², and the lower jaws, A³, to bear against the posts. In a slot formed in one of the latter jaws is centered the cam-gripper C, which compresses the wire between it and the opposite jaw. The reel or windlass B, which is also by preference made of malleable cast-iron, has the ratchet-toothed flanges B' formed on it and the projecting pintles B², which fit within the open-ended bearings A⁴, formed in said cheeks A'.

B³ is the hole in the reel to receive the end of the wire which is to be strained.

D is the bifurcated hand-lever, having the slot-holes D' formed in its cheeks to receive the pintles of the reel, which is permanently secured within said bifurcated end of the lever.

D² is the cross-pin to engage with the ratchet-teeth B'.

A⁵ is the retaining-pin, secured by its ring ends within the curved slot-holes A⁶ in the cheeks A'.

A⁷ is a flat spring acting upon said retaining-pin and secured to the bottom of the body by the rivet A⁸, which also secures the flat spring A⁹ in position. This spring A⁹ is turned downward and has the slot-hole A¹⁰ in it to catch one of the wires E that are being strained.

A¹¹ is a hook or finger projecting from the bottom of the body A to receive the loop at end of said wire E, and this hook-finger has a recess, A¹², formed at its end and continued through the bottom of the body to allow the other wire, E', to be threaded through it and passed onto the reel on which it is to be wound.

The mode of operation is as follows: To strain two wires which are to be secured together at any position between the posts, I first make a loop on the wire E large enough to pass it over the hook A¹¹ at the bottom of the strainer and place it within the catch A¹⁰. I then thread the other wire, E', through the loop at the end of the wire E and pass its end into the hole in the reel B, which may now be wound up, by means of the hand-lever D, so as to strain the wires, the retaining-pin A⁵ being forced into the lower portion of its slots A⁶ clear of the ratchet-flanges B'. When this is done sufficiently, the cam-gripper C is placed in position to grip the wire E. Thus the wires are held strained. The reel may now be drawn from its bearing by pulling outward the hand-lever D, so as to uncoil the wire, which is then wound upon itself so as to form a loop inclosing the loop of the other wire, thus binding the wires together. The cam-gripper C is now released and the machine is taken from the wires. In mending or reuniting broken wires this operation is the same, except that in some cases it will be necessary to join a piece of wire to one of the ends to give sufficient length.

To strain a wire at a post the end with the arms A² and gripper C is placed against the post and the wire passed into the hole B³ in the reel B, which is then wound by the aid of the lever D. When the wire has been sufficiently strained, the cam-gripper C is caused to grip and retain the strain upon the wire, and the lever and reel are pulled outward to unwind the surplus wire. The body of the machine is then tilted, so as to allow a wedge to be driven into the hole in the fence-post, through which the wire passes, in order to retain the wire, after which the machine is released and the wire secured in the usual manner.

Having now particularly described and ascertained the nature of my said invention and in what manner the same is to be performed, I declare that what I claim is—

1. A wire-straining machine having a body portion, A, composed of bottom portion having a pair of side wings or arms having at their front ends upwardly-extending arms A² and a pair of jaws, A³, to bear against the fence-post, and at their rear upwardly-extending cheeks A', between and within which the wire-coiling reel is journaled and supported, a cam-shaped wire-gripper, C, pivoted within a slot in one of said jaws A³, to grip the wire against the other of said jaws, a wire-coiling reel, B, journaled between and within said cheeks A and having a hole, B³, therein to receive the end of the wire to be strained, and toothed flanges at its ends, a bifurcated hand-lever engaging said toothed flanges for the purpose of rotating said reel, a spring secured to the body A and having a downturned slotted portion to receive one of the wires being strained, and a slotted hook-shaped finger projecting from the bottom of the body A to receive the wires to be strained, substantially as set forth.

2. A wire-straining and wire mending or connecting machine comprising a body portion having at its front end a pair of jaws and a pair of upwardly-extending arms to engage the fence-post, at its bottom a slotted hook-shaped finger to receive the looped end of one wire or portion of a broken wire, and also permit of the passage to the reel of the wire to be strained, and at its rear end upwardly-extending cheeks to receive the reel, a cam-shaped wire-gripper journaled within one of said jaws, a wire-receiving reel journaled between said cheeks and having a hole therein to receive the end of the wire being strained, and at its ends toothed disks or flanges, a bifurcated operating-lever having a cross-pin to engage the toothed flanges and rotate the reel, a spring-held reel-retaining pin, and a downturned flat spring secured to the body of the machine and having a slot therein to hold one of the wires being strained, all substantially as and for the purpose set forth.

JOHN REID.

Witnesses:
ROBERT MCCULLOCH,
JAMES SCOTT ARCHER.